United States Patent

Potter

[15] 3,696,856

[45] Oct. 10, 1972

[54] SWIVEL STANDARD FOR PORTABLE PROJECTION SCREEN

[72] Inventor: Fred S. Potter, Warsaw, Ind.

[73] Assignee: Da-Lite Screen Company, Inc., Warsaw, Ind.

[22] Filed: Dec. 21, 1970

[21] Appl. No.: 100,128

[52] U.S. Cl. .....................160/24, 248/169, 248/415
[51] Int. Cl. ...........................................G03b 21/56
[58] Field of Search .......................308/238; 160/24; 248/168–171, 415, 418

[56] References Cited

UNITED STATES PATENTS

| 1,959,886 | 5/1934 | Wadsworth | 248/168 |
| 3,321,164 | 5/1967 | Petrick | 160/24 |
| 3,356,426 | 12/1967 | Fadow | 308/238 |

Primary Examiner—Peter M. Caun
Attorney—Rummler & Snow

[57] ABSTRACT

A standard for a portable projection screen providing for improved image focus and picture clarity over the whole of the screen by easy and convenient swivel adjustment of the screen about the stand axis without lifting the standard base off the floor.

3 Claims, 5 Drawing Figures

PATENTED OCT 10 1972 3,696,856

INVENTOR.
FRED S. POTTER

BY Rummler & Snow
ATTY

3,696,856

SWIVEL STANDARD FOR PORTABLE PROJECTION SCREEN

BACKGROUND OF THE INVENTION

The setting up of portable picture projection equipment in the home, office, school or lecture hall has always been a problem. Much time and patience is required to correctly line up the screen with the optical axis of the lense so that the picture is in focus over the whole of the screen area. For commercial quality projector lenses rays from any point of an object such as a picture on a 35 mm film after refraction by the lens meet at a real foci. A screen properly placed at the real foci for all points on the object would receive these rays in focus at all points on a plane and show a clear inverted image of the object. If the screen or any part thereof does not fall on this plane of real foci, it would receive the rays from each point of the object at more than one point and the image would be out-of-focus and blurred.

It is thus an object of the present invention to provide a portable projection screen which may be easily and readily handled for proper placement before the projector so that all points of the image projected thereon are in focus and clear, without physical movement of the entire screen.

SUMMARY OF THE INVENTION

The present invention relates to improvements in a portable picture projection screen and is more particularly directed to the picture screen supporting standard on which is carried a suitable reel of picture screen fabric which may be easily and readily set up for use and correct focus and collapsed for portable purposes. The invention relates to tripod stands for screens upon which pictures are projected and has particular reference to means for full swivel adjustment of the screen on the stand for improved picture focus without having to lift the entire structure off the floor.

The gist of this invention lies in the use of swivel means on a standard for a portable projection screen to provide for improved image focus and picture clarity over the whole of the screen by easy and convenient swivel adjustment of the screen about a vertical axis without lifting the entire structure off the floor.

DESCRIPTION OF THE DRAWINGS

In order to demonstrate the invention, reference is made to the specific embodiment illustrated by the following drawings.

DESCRIPTION OF THE PREFERRED EMBODIMENT

Figure 1:
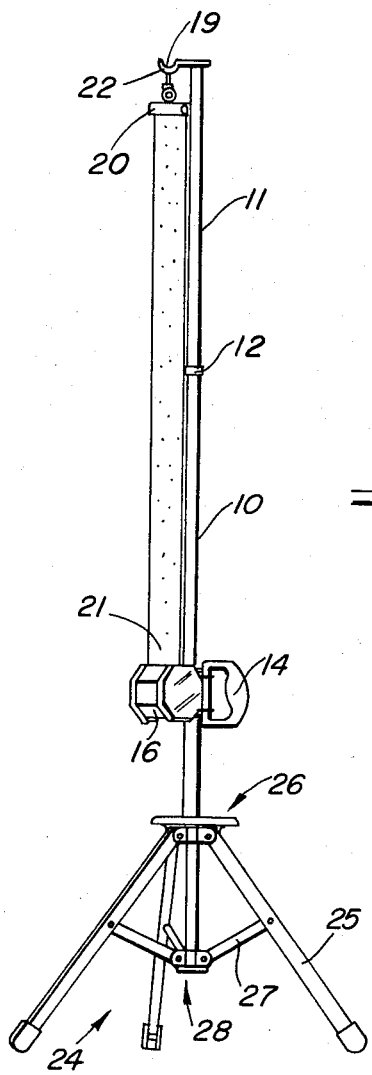
FIG. 1 is a perspective side view of the improved screen standard set up for picture projection purposes showing the picture screen at any arbitrary swivel angle with respect to the tripod legs shown expanded for supporting the standard in an upright position on the floor.
Figure 2:
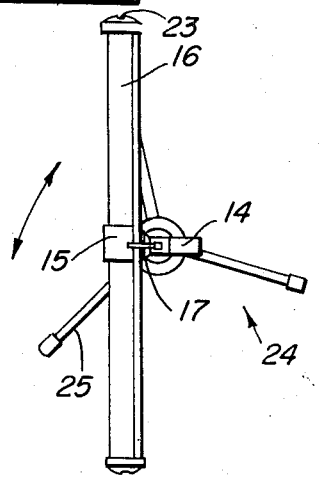
FIG. 2 is a top view of the improved screen standard set up for picture projection purposes showing the swivel of the projection screen relative to the standard tripod base on the floor.

In the form shown in FIGS. 1 and 2, the tripod, standard and reel housing are of well-known construction but modified to accomodate the swivel means of the present invention.

The main standard 10 is usually a square tube having an extension rod 11 telescoping therewith and being guided in its vertical movement by cap 12 on the upper end of the standard 10 and a cap on the lower end of the extension rod which is loosely slidable within the inner walls of the tube 10.

A handle 14 is carried by a screen housing bracket 15 which is usually adjustably slidable on the standard 10, to which bracket the screen housing 16 is pivotally mounted at 17 so as to swing from the position of parallelism with the standard 10 for portable purposes to a position at right angles to the standard for picture projection purposes, as shown in the drawings. The upper end of the extension rod 11 has an upturned hook 19 upon which the bail of the slat 20 of the screen reel 21 may be hung and has a depending finger 22 for engaging a socket in the cap 23 on the end of the screen housing 16.

Figure 4:
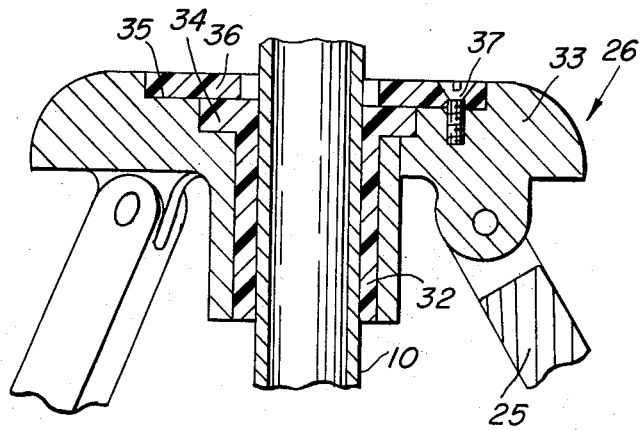
FIG. 4 is a fragmented side view of the top bracket showing the nylon cylindrical bushing and the top spider with pivoted tripod legs.
Figure 5:
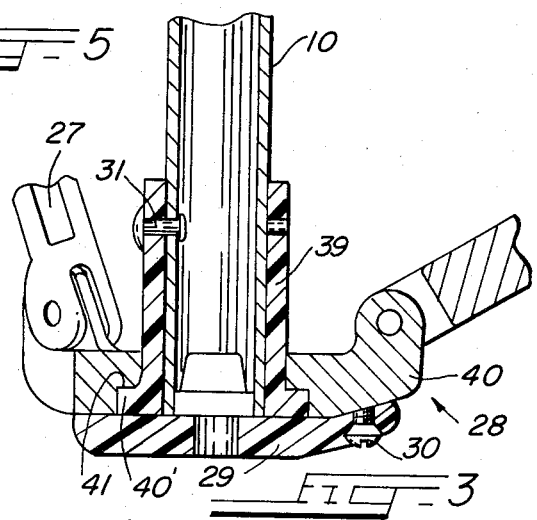
FIG. 5 is a fragmented side view of the bottom bracket showing the nylon cylindrical bushing and the bottom spider with pivoted spreader links.
Figure 3:
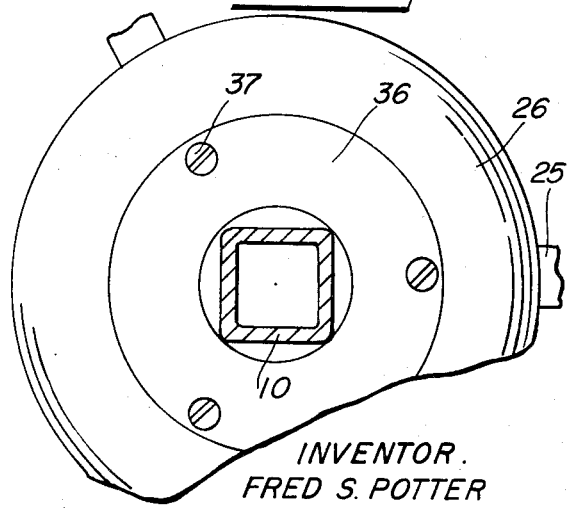
FIG. 3 is a fragmented top view of the top bracket showing the nylon cylindrical bushing and the tripod legs pivotally mounted to the top spider.

The standard 10 is supported in its upright position, as shown in FIG. 1, by standard base 24 tripod legs 25 that are pivotally mounted on a top bracket means 26 that is loosely slidable along standard 10, as shown in FIGS. 3 and 4, and that is connected by spreader links 27 to a bottom bracket means 28 that is fixed at the lower end of the standard 10 by means of cap plate 29, screws 30 and rivet 31, as shown in FIG. 5. As indicated in the drawings, the legs 25 and the spreader links 27 are of channel shape in cross-section. FIG. 2 shows the swivel adjustment of screen 21 relative to the tripod legs 25 of standard base 24.

Top bracket means 26 in FIGS. 3 and 4 is comprised of cylindrical nylon bushing 32 having a square bore for slidable movement on the square tube of standard 10 and top spider 33 having a cylindrical bore for rotatably mounting on cylindrical nylon bushing 32. Cylindrical nylon bushing 32 has an integral shoulder 34 thereon fitting in counter bore 35 in top spider 33 for integral subassembly of these concentric parts thereby. Retaining ring 36 connected by screw 37 to counter bore 35 of top spider 33 makes a complete subassembly with nylon bushing 32.

Bottom bracket means 28 in FIG. 5 is comprised of cylindrical nylon bushing 39 likewise having a square bore for assembly and fixture on the lower end of square tube standard 10 and bottom spider 40 having a cylindrical bore for rotatably mounting on cylindrical nylon bushing 39. Cylindrical nylon bushing 39 has an integral shoulder 40' thereon fitting in counter bore 41 in bottom spider 40 for integral subassembly of these concentric parts thereby. Cap plate 29 connected by screws 30 to bottom spider 40 makes a complete subassembly with nylon bushing 39. Rivet 31 through standard 10 and bushing 39 fixes bottom bracket means 28 to the lower end of standard 10.

The operation of the invention is as follows:

To bring the projected picture on the screen in clear focus overall, the standard on its tripod is first positioned at the desired distance from the projector with the screen lying approximately in the plane of real foci for the distance involved. The image is then made clear on part of the screen by adjustment of the focus of the projector lense. The image is then brought in focus over all of the screen by swiveling of the screen until clarity is complete.

Although but one specific embodiment of this invention has been herein shown and described, it will be understood that the details of construction shown may be altered or omitted without departing from the spirit of the invention as defined in the appended claims.

I claim:

1. In a portable projection screen having a squared cross-section standard, a base having tripod legs and spreader links, the improvement comprising a means on said base for swiveling the standard about a vertical axis without lifting the standard base off the floor, said swivel means comprising:
   a. a top bracket means pivotally mounting the tripod legs and having an axial bore means for sliding along and swively mounting said standard; and
   b. a bottom bracket means pivotally mounting the spreader links and having a shouldered bore means for swively mounting and supporting said standard, said top bracket means comprises:
   c. a top spider having a cylindrical bore;
   d. a shouldered cylindrical bushing having a squared cross-section axial bore for the reception of the lower portion of the standard; and
   e. a retaining ring anchored on the top spider for retaining the shouldered cylindrical bushing in the top spider.

2. In the portable projection screen of claim 1 wherein the bottom bracket means comprises:
   a. a bottom spider having a shouldered cylindrical bore;
   b. a shouldered cylindrical bushing having a squared cross-section axial bore;
   c. a cap plate mounted on the lower side of the bottom spider for supporting the shouldered cylindrical bushing in the bottom spider; and
   d. means for fixing the shouldered cylindrical bushing to the standard. a cylindrical retaining means, links said bottom spider cylindrical.

3. In a portable projection screen comprising a square tubular standard, a top bracket means slidable along said standard, a plurality of legs located for supporting said standard in an upright position and pivoted on said top bracket means, said top bracket means comprising a top spider having a cylindrical bore, a shouldered bushing having an axial square in cross section bore, a retaining ring mounted on the top spider for retaining the shouldered cylindrical bushing in said top spider, a bottom bracket means on the lower end of said standard spaced from said top bracket means, links connecting said legs to said bottom bracket means for swinging said legs toward and away from said standard through sliding movement of said top bracket means, said bottom bracket means comprising a bottom spider having a cylindrical bore, a shouldered cylindrical bushing having a square in cross section bore, a cap plate mounted on the bottom spider for retaining the shouldered cylindrical bushing in said bottom spider, and means for fixing the shouldered cylindrical bushing to the standard.

* * * * *